United States Patent [19]

Johnson

[11] Patent Number: 4,601,307
[45] Date of Patent: Jul. 22, 1986

[54] LUBRICATED PLUG VALVE
[75] Inventor: Bruce R. Johnson, Sebastopol, Calif.
[73] Assignee: Jandy Industries, Novato, Calif.
[21] Appl. No.: 752,633
[22] Filed: Jul. 8, 1985
[51] Int. Cl.⁴ ............................................. F16K 5/22
[52] U.S. Cl. ..................... 137/246.22; 137/625.41; 137/625.46
[58] Field of Search ............ 137/246, 246.11, 246.12, 137/246.15, 246.22, 625.22, 625.41, 625.46, 625.47, 246.16

[56] References Cited

U.S. PATENT DOCUMENTS

| | | | |
|---|---|---|---|
| 825,706 | 7/1906 | Dyblie | 137/556 |
| 1,166,571 | 1/1916 | Bard | 137/625.45 |
| 1,554,470 | 9/1925 | Trumble | 137/246.15 |
| 2,708,096 | 5/1955 | Mueller | 137/246.15 |
| 2,829,688 | 4/1958 | Mueller | 137/246.16 |
| 3,072,379 | 1/1963 | Hamer | 137/246.22 |
| 3,834,537 | 9/1974 | Brett | 137/625.46 |
| 3,938,553 | 2/1976 | Ortega | 137/625.47 |
| 4,196,749 | 4/1980 | Wulf | 137/625.47 |
| 4,470,429 | 9/1984 | Johnson | 137/270 |

FOREIGN PATENT DOCUMENTS

| | | | |
|---|---|---|---|
| 1329057 | 4/1963 | France | 137/625.41 |
| 0092495 | 10/1983 | France | 137/625.46 |

Primary Examiner—G. L. Walton
Attorney, Agent, or Firm—Melvin R. Stidham

[57] ABSTRACT

A rotary plug valve having a smooth, cylindrical inner sealing surface between the flow passageways with a grease fitting port opening through it. When the valve plug is turned to an intermediate position in alignment with the grease fitting, a charge of grease may be introduced through the fitting to be confined by a seal ring on the plug. When the plug is thereafter turned, a quantity of grease is distributed over the inner surface to facilitate valve operation.

2 Claims, 1 Drawing Figure

U.S. Patent     Jul. 22, 1986     4,601,307
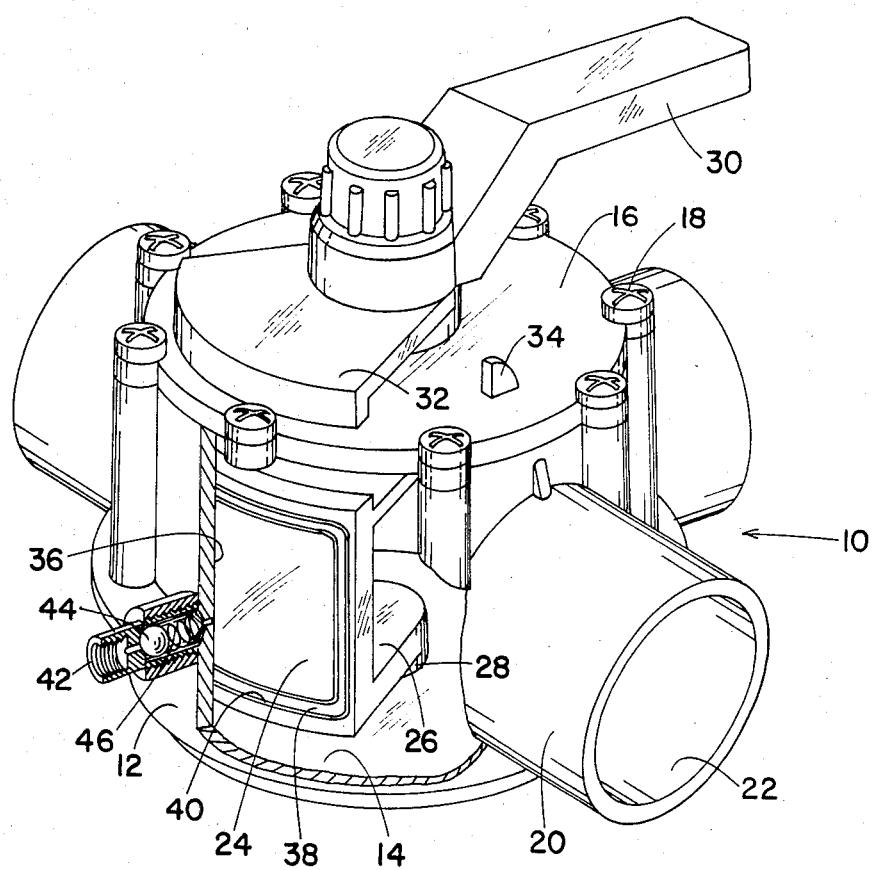

LUBRICATED PLUG VALVE

BACKGROUND OF THE INVENTION

Plug valves generally include a body with a cylindrical or conical inner surface and a rotatable closure member having a complementary sealing surface to block one or more flow passageways extending through the valve. The closure member generally fits very tightly against the internal surface of the body around the flow passage and, particularly when it remains in one position for an extended period of time, it tends to become bound and is turned only with a great deal of effort and difficulty. Others have attempted to lubricate the valve, particularly around the journals, but grease applied to the sealing surface of the valve body or plug tends to become easily dissipated and rubbed away.

OBJECTS OF THE INVENTION

It is an object of this invention to provide a plug valve with means for introducing a lubricant to be carried directly on the surface of the valve closure member.

It is a further object of this invention to provide a plug valve with means for introducing a controlled quantity of grease to lubricate the mating surfaces of the valve.

Other objects and advantages of this invention will become apparent from the description to follow, particularly when read in conjunction with the accompanying drawings.

SUMMARY OF THE INVENTION

In carrying out this invention, there is provided a generally cylindrical valve body with laterally extending hubs containing flow passageways. For example, the valve body may have two axially aligned passageways or three passageways disposed in a T-pattern. A valve closure with a cylindrical outer surface of an arcuate width to block a flow passageway is rotatable in the valve body to block, or partially block, a selected one of the flow passageways. The valve closure has a continuous resilient seal around its sealing surface to surround a flow passageway and make a fluidtight seal when the closure member is aligned with it. Carried on the valve body intermediate axially aligned flow passageways is a grease fitting through which grease may be introduced into the valve body. When the closure member is aligned with the grease fitting a quantity of lubricant may be introduced into the valve body to be contained within the area of the closure area encompassed by the seal member. Then, when the valve is turned, the lubricant is distributed over the inner surface of the valve body to provide an effective lubricant.

BRIEF DESCRIPTION OF THE DRAWING

The drawing is a view in perspective, partially broken away, showing a three-way plug valve embodying features of this invention.

DESCRIPTION OF A PREFERRED EMBODIMENT

Referring now to the drawing with greater particularity, the plug valve 10 of this invention includes a generally cylindrical receptacle or body 12, including a bottom wall 14, which may be integral therewith, and a top closure 16, which is secured to the body 12, as by means of screws 18. Extending radially from the body 12 are hubs 20 having flow passageways 22 therethrough for connection to pipes (not shown). In the three-way valve 10 shown, there are three hubs 20, but this invention is equally applicable to a simple two-way valve wherein there are just two hubs and flow passageways 22.

A valve closure plug 24 is carried on radial arms 26 which, in turn, carry stub shafts 28 that are rotatably carried in the bottom 14 and the top closure 16, respectively. Secured to the valve closure member 24 is a lever arm 30 by means of which the closure member can be moved to a selected angular position around the cylindrical or conical surface of the valve body 12.

A position indicator sector 32 is carried on the valve lever arm 30 to indicate the position of the closure plug 24, and means on the indicator are engageable with stops 34 on the top closure to prevent closing off the particular hub 20 that is connected to a pump (not shown) so that there will always be flow through one or both of the other hubs 20.

The inner surface 36 of the valve body 12 may be conical or cylindrical, as shown, and the valve closure plug 24 has a complementary mating surface that carries a continuous resilient seal member 38. The seal member 38 may be an O-ring carried in a groove 40 in the closure member 24 and is of a dimension to surround a selected flow passageway 22 with which it may be aligned. The seal member 38 shown is generally rectangular in outline but it may be of any continuous configuration, e.g. circular or oval, of sufficient size to surround the flow passageway 22.

Carried in the side wall of the valve body 12, intermediate the aligned hubs 20 is a grease fitting 42, including a one-way ball check valve 44 that is normally biased by a spring 46 into engagement with a seat to prevent outward flow of fluid from the valve body 12 but to admit grease from a grease gun (not shown). The inner surface 30 of the valve body is round in cross-section, relatively smooth, being made of a suitable plastic material. Hence, in any position of the valve closure 24 the area encompassed by the seal ring 38 is sealed off and entraps any fluid therein.

When the valve is positioned as shown in the drawing, with the closure member 24 in alignment with the grease fitting 44, a quantity of grease may be introduced through the fitting and be contained by the surrounding resilient seal. This ensures that a controlled quantity of grease is introduced and that it is not spread over nonengaging surfaces within the valve without control.

Then, when the closure plug 24 is rotated within the valve body 12, a portion of the grease is distributed over the inner surface 36 of the valve body 12 to facilitate valve operation. However, being contained, some of the grease will remain within the seal ring 38 to apply to non-lubricated surfaces on subsequent valve operation.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A rotary plug valve comprising:
   a valve body annular in cross-section;
   at least two hubs extending radially from said body and having flow passageways therethrough opening into said valve body;

a smooth circular inner surface around said body forming an internal sealing surface around and intermediate said flow passageways;

a valve closure member rotatable in said body and having an arcuate outer surface complementary with said sealing surface and fitting closely therein;

a seal ring recess formed in said arcuate surface;

a resilient seal ring in said recess;

said seal ring being large enough to engage fully said sealing surface completely around either of said flow passageways but small enough to engage fully said sealing surfaces and enclose an area thereof at a grease application position between two of said flow passageways; and a grease port through the annular wall of said body positioned so that when said closure member is in said grease application position a confined quantity of grease is introduced between said sealing surface and said arcuate outer surface in said enclosed area defined by said seal ring whereby said enclosed area on said valve closure distributes the grease over said sealing surface between said grease application position and a valve close position.

2. The rotary plug valve defined by claim 1 wherein: said sealing surface and said arcuate outer surface are cylindrical.

* * * * *